2 Sheets—Sheet 1.

R. B. BLOWERS.
Fruit-Drier.

No. 214,807. Patented April 29, 1879.

Witnesses
Geo. H. Strong
Frank A. Brooks

Inventor
Russel B. Blowers
by
Dewey & Co
attys

2 Sheets—Sheet 2.

R. B. BLOWERS.
Fruit-Drier.

No. 214,807. Patented April 29, 1879.

Witnesses
Geo. H. Strong.
Frank A. Brooke

Inventor
Russel B. Blowers
By Dewey & Co.
Attys

UNITED STATES PATENT OFFICE.

RUSSEL B. BLOWERS, OF WOODLAND, CALIFORNIA.

IMPROVEMENT IN FRUIT-DRIERS.

Specification forming part of Letters Patent No. 214,807, dated April 29, 1879; application filed October 1, 1878.

*To all whom it may concern:*

Be it known that I, RUSSEL B. BLOWERS, of Woodland, county of Yolo, and State of California, have invented an Improvement in Fruit-Driers; and I do hereby declare the following to be a full, clear, and exact description thereof, reference being had to the accompanying drawings.

My invention relates to certain improvements in driers; and it is more especially applicable to that class in which heated air is caused to pass from a supply chamber or chambers over and through a body of fruit or other substance, and is drawn off through a chimney or uptake, so as to continually renew the body of air within the drier, and thus convey away the moisture.

I have shown my invention as applied to an apparatus for which Letters Patent were issued to me February 13 and May 29, 1877; and it consists in the application of a mechanical method of increasing the amount of air passing through the chambers, whether one or more be employed, by means of an adjustable propeller within the uptake or discharge passages, together with certain details of construction, which will be more fully described by reference to the accompanying drawings, in which—

Figure 1:
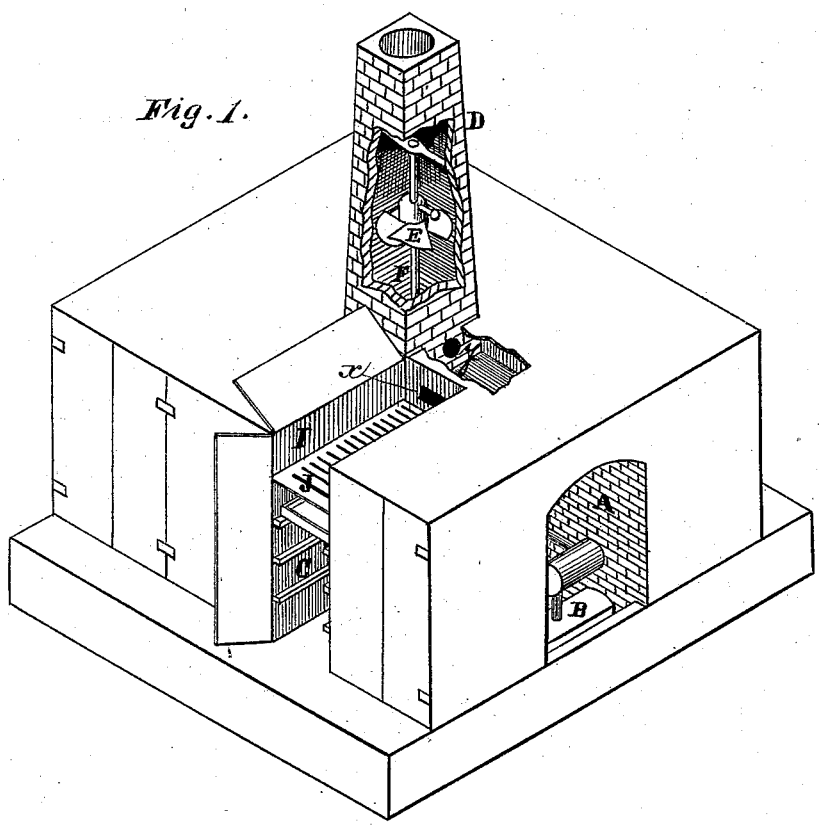
Figure 2:
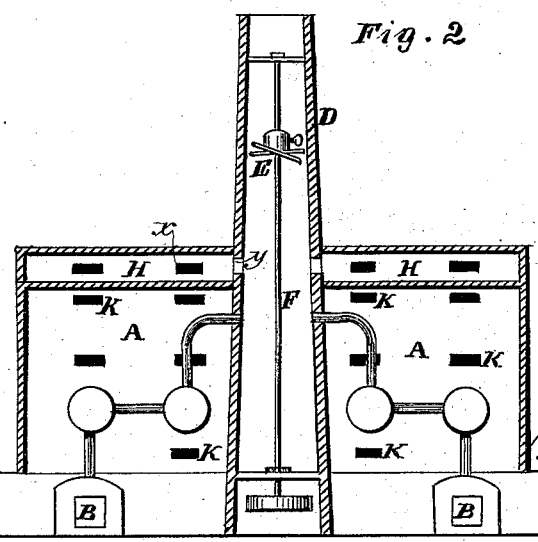
Figure 3:
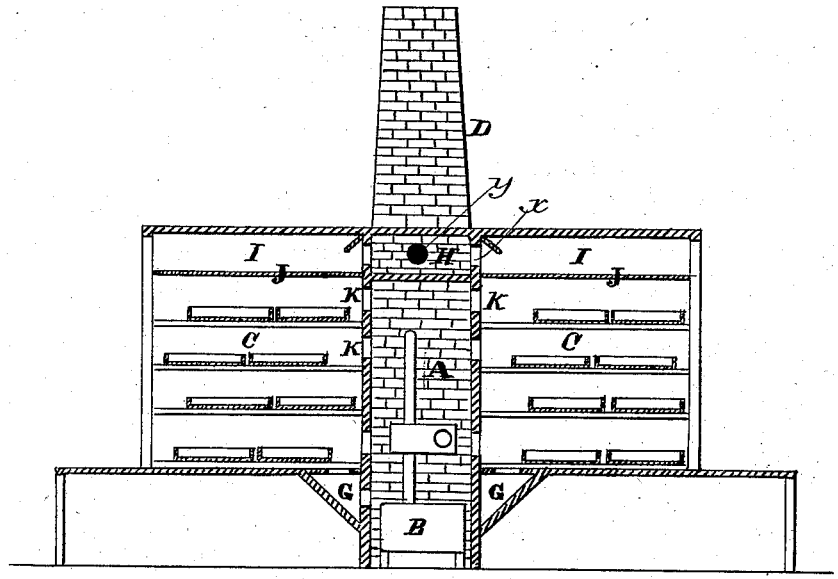

Figure 1 is a view of my apparatus. Fig. 2 is a section, showing the uptake and propeller. Fig. 3 is a transverse section.

A is the heating-chamber, which is provided with the heaters B, as described in my former patents, and the drying chamber or chambers C, as shown. D is the uptake or draft-chimney, which receives the heated air as it escapes from the chambers, either from the top or bottom of the drying-chamber, as the current of air may be an upward or downward current.

In drying extraordinary quantities of any substance it may be found desirable to pass the current of heated air through the chambers even faster than can be done by the aid of the natural draft; and this I accomplish by the mechanical aid of a propeller, E, which may be connected, in any desirable manner, with the outlet-passages. In the present case I have shown it mounted upon a vertical shaft, F, within the chimney or uptake D. When it is desired to use this propeller it is driven by any suitable power, and the flues or passages G may be opened when a downward, or partially downward, current is to be established; or they may be closed and the valves or gates connecting with the upper passages, H, be opened, to establish an upwardly-flowing current, as shown in my patent previously referred to.

The propeller is adjusted upon the shaft by means of a set-screw, and when not needed it may be moved to the bottom of the chimney, so as to allow a free natural draft.

Having thus described my invention, what I claim as new, and desire to secure by Letters Patent, is—

1. The heating-chamber A and the drying-chambers C, with their series of trays or shelves, together with the flues or passages G, H, and X, by which an upward or downward current is produced, in combination with the discharge-passage or chimney D, with its shaft F and draft-propeller E, substantially as herein described.

2. The heating-chamber A, with the drying-chambers C, flues or passages G, H, and X, and discharge-passage or chimney D, in combination with the propeller E, said propeller being adjustable upon its shaft, substantially as and for the purpose herein described.

In witness whereof I hereunto set my hand.

R. B. BLOWERS.

Witnesses:
FRANK A. BROOKS,
CHAS. G. YALE.